(12) United States Patent
Martin et al.

(10) Patent No.: US 7,299,214 B2
(45) Date of Patent: Nov. 20, 2007

(54) SYSTEM FOR PREDICTIVE ANALYSIS OF TIME SERIES DATA FLOWS

(75) Inventors: Stephane Martin, Paris (FR); Guillaume Allys, Paris (FR); Luc de Bois, Courbevoie (FR)

(73) Assignee: France Telecom, Paris (FR)

( * ) Notice: Subject to any disclaimer, the term of this patent is extended or adjusted under 35 U.S.C. 154(b) by 343 days.

(21) Appl. No.: 10/503,744

(22) PCT Filed: Feb. 3, 2003

(86) PCT No.: PCT/FR03/00326

§ 371 (c)(1),
(2), (4) Date: Feb. 7, 2005

(87) PCT Pub. No.: WO03/067463

PCT Pub. Date: Aug. 14, 2003

(65) Prior Publication Data

US 2005/0119960 A1      Jun. 2, 2005

(30) Foreign Application Priority Data

Feb. 6, 2002   (FR) ................................... 02 01417

(51) Int. Cl.
*G06F 17/00*   (2006.01)

(52) U.S. Cl. ........................... 706/21; 706/12; 706/15; 706/45; 705/10; 705/35; 705/36 R

(58) Field of Classification Search .................... 706/1, 706/12–21, 45–52; 705/10, 35, 36 R
See application file for complete search history.

(56) References Cited

U.S. PATENT DOCUMENTS

| 5,675,710 A * | 10/1997 | Lewis ......................... 706/12 |
| 6,026,397 A | 2/2000 | Sheppard |
| 6,125,105 A * | 9/2000 | Edwards et al. ............. 370/230 |
| 6,751,606 B1 * | 6/2004 | Fries et al. ..................... 707/3 |
| 2003/0078899 A1 * | 4/2003 | Shanahan ....................... 706/8 |

FOREIGN PATENT DOCUMENTS

EP        1 107 157        8/1998

OTHER PUBLICATIONS

Pantazopoulos, Konstaninos, et al., Financial Prediction and Trading Strategies Using Neurofuzzy Approaches, IEEE Transasctions on System, Man and Cybernetics. Part B.
Cybernetics, IEEE Service Center, US, vol. 28, No. 4, Aug. 1, 1998. pp. 520-531.

* cited by examiner

*Primary Examiner*—Joseph P Hirl
*Assistant Examiner*—Omar F Fernández Rivas
(74) *Attorney, Agent, or Firm*—Oliff & Berridge, PLC

(57) ABSTRACT

This system for predictive analysis of digital data time flows associated with text information (18) comprises means (12) for automatically predicting values (24) of a digital data time flow from past values (22) of said flow. It further comprises means (14) for analyzing text information (18) to supply the prediction means (12) with a weighted concept vector (20) associated with the past values (22) of the digital data time flow.

10 Claims, 1 Drawing Sheet

SYSTEM FOR PREDICTIVE ANALYSIS OF TIME SERIES DATA FLOWS

BACKGROUND

The present invention relates to a system for predictive analysis of numeric data time flows which are associated with text information.

DESCRIPTION OF RELATED ART

Numerous systems for predictive analysis of that type are already known. They are generally based on analyzing past values of a numeric data time flow in order to produce future values of said flow. However, financial textual information supplied with the past values also has a non-negligible influence on the future values of the numeric data time flow. Thus, conventional systems for predictive analysis cannot be entirely reliable.

SUMMARY

The invention seeks to remedy this drawback by providing a system for predictive analysis that improves prediction of data time flows. To do this, the system for predictive analysis includes means for automatically predicting values of a numeric data time flow on the basis of past values of said flow.

The invention thus provides a system for predictive analysis of the above-specified type, characterized in that it includes means for analyzing text information in order to supply the prediction means with a vector of weighted concepts associated with the past values of the numeric data time flow.

Thus, a system of the invention also takes account of textual information associated with the numeric data time flow under analysis, in order to perform prediction. The predictive results are correspondingly improved.

A predictive analysis system of the invention may further comprise one or more of the following characteristics:

the prediction means are also means for predicting future values of a weighted concept vector on the basis of past values of the numeric data time flow and the past values of the weighted concept vector;

the system includes means for generating future text information on the basis of the future values of the predicted weighted concept vector; and the prediction means comprise a neural network receiving as input the past values of the numeric data time flow and of the weighted concept vector, and supplying as output the future values of the numeric time flow and of the weighed concept vector.

DETAILED DESCRIPTION

Figure 1:
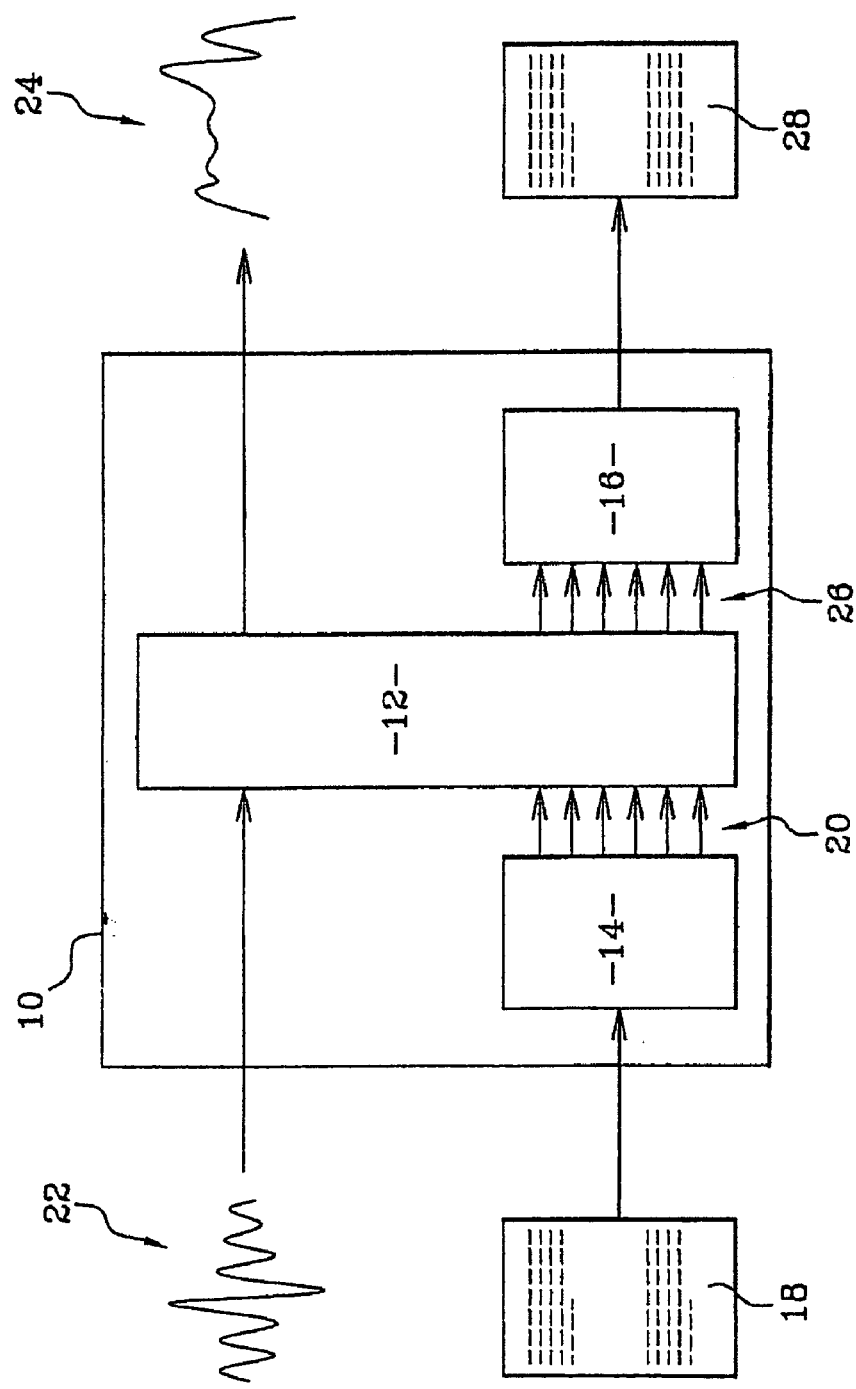
FIG. 1 is an exemplary diagram of a predictive analysis system.

The present invention will be better understood from the following description given purely by way of example and made with reference to the accompanying drawing, in which the sole FIGURE is a diagram of a predictive analysis system of the invention.

In this sole FIGURE, the central unit 10 of a computer includes automatic prediction means 12. These means comprise a conventional neural network, for example.

The central unit 10 also includes means 14 for performing semantic analysis of text information and means 16 for generating a conceptual summary. These analysis and generator means 14 and 16 are connected to the neural network 12, respectively to its input and to its output.

The semantic analysis means 14 are conventional. By way of example, they comprise the semantic analyzer as developed by the supplier Convera. These semantic analysis means 14 are adapted to receive text information 18 as input and to output a vector 20 constituting a model of the text information 18 in a multidimensional space of predefined concepts. The coordinates of this concept spectrum 20 describe accurately the nub of the concepts contained in the text information 18.

The concept vector 20 is supplied to the input of the neural network 12 together with past values 22 of a numeric data time flow.

The neural network 12 is configured in such a manner that it outputs firstly predictive values 24 for the numeric data time flow, and secondly a predictive concept vector 26. The configuration of the neural network 12 is obtained in conventional manner by a series of training sessions.

The predictive concept vector 26 is supplied at input to the conceptual summary generator means 16 which in turn output predicted text information 28. The conceptual summary generator means are adapted to supply intelligible text on the basis of concepts in the predetermined concept space, as weighted by the predictive concept vector 26.

It can clearly be seen that the system described above makes it possible to improve the prediction of numeric data time flows by also taking account of text information associated with the past values of the flow.

It can clearly be seen that the system described above makes it possible to improve the prediction of numeric data time flows by also taking account of text information associated with the past values of the flow.

Another advantage of the system is that it also makes it possible to provide predicted text information on the basis of past text information and of past values of the numeric data time flow associated with the past text information.

This system is particularly suitable for processing financial data time flows.

The invention claimed is:

1. A system for predictive analysis of numeric data time flows associated with text information, the system comprising:

prediction means for automatically predicting values of a numeric data time flow based on past values of the numeric data time flow; and analyzing means for analyzing text information to provide the prediction means with a weighted concept vector associated with the past values of the numeric data time flow, wherein the prediction means outputs predicted values of the numeric data time flow.

2. A system for predictive analysis according to claim 1, wherein the prediction means predicts future values of a weighted concept vector based on the past values of the numeric data time flow and past values of the weighted concept vector.

3. A system for predictive analysis according to claim 2, further comprising means for generating future text information based on the future values of the weighted concept vector.

4. A system for predictive analysis according to claim 3, the prediction means comprising a neural network receiving the past values of the numeric data time flow and the past values of the weighted concept vector as input, and supplying the future values of the numeric time flow and the future values of the weighed concept vector as an output.

5. A system for predictive analysis according to claim 1, wherein the numeric data time flow is financial data time flow.

6. A system for predictive analysis of numeric data time flows associated with text information, the system comprising:
   a predictor for automatically predicting values of a numeric data time flow based on past values of the numeric data time flow; and
   an analyzer for analyzing text information to provide the predictor with a weighted concept vector associated with the past values of the numeric data time flow,
   wherein the predictor outputs predicted values of the numeric data time flow.

7. A system for predictive analysis of numeric data time flows associated with text information, the system comprising:
   prediction means for automatically predicting values of a numeric data time flow based on past values of the numeric data time flow; and
   analyzing means for analyzing text information to provide the prediction means with a weighted concept vector associated with the past values of the numeric data time flow,
   wherein the prediction means predicts future values of the weighted concept vector based on the past values of the numeric data time flow and past values of the weighted concept vector,
   the system further comprising means for generating future text information based on the future values of the weighted concept vector.

8. A computer comprising a system according to claim 1.

9. A method for predictively analyzing numeric data time flows associated with text information, the method comprising:
   analyzing text information to provide a weighted concept vector associated with past values of a numeric data time flow; and
   automatically predicting future values of the numeric data time flow based on past values of the numeric data time flow and the weighted concept vector.

10. A computer-readable medium storing a computer program, the computer program comprising instructions for executing a method according to claim 9.

* * * * *

UNITED STATES PATENT AND TRADEMARK OFFICE
CERTIFICATE OF CORRECTION

PATENT NO. : 7,299,214 B2
APPLICATION NO. : 10/503744
DATED : November 20, 2007
INVENTOR(S) : Stephane Martin, Guillaume Allys and Luc De Bois It is certified that error appears in the above-identified patent and that said Letters Patent is hereby corrected as shown below:

Column 2, line 47, cancel the text beginning with "1. A system" to and ending "numeric data time flow." in column 2, line 58, and insert the following claim:

1. A system for predictive analysis of numeric data time flows associated with text information, the system comprising:
        a numeric data time flow input;
        a text information input;
        prediction means for automatically predicting values of a numeric data time flow based on past values of the numeric data time flow input and a weighted concept vector; and
        analyzing means for analyzing text information to provide the prediction means with a weighted concept vector in a multi-dimensional space of predefined concepts, the weighted concept vector being associated with the past values of the numeric data time flow,
        wherein the prediction means receives as inputs the past values of the numeric data time flow input and the weighted concept vector, and outputs predicted numeric data time flow values based on the predictive analysis of numeric data time flow input and the weighted concept vector.

Column 2, line 59, cancel the text beginning with "2. A system" to and ending "weighted concept vector." in column 2, line 63, and insert the following claim:

2. A system for predictive analysis according to claim 1, wherein the prediction means predicts future values of a weighted concept vector based on the past values of the numeric data time flow input and past values of the weighted concept vector.

Column 3, line 1, cancel the text beginning with "4. A system" to and ending "an output." in column 3, line 6, and insert the following claim:

4. A system for predictive analysis according to claim 3, the prediction means comprising a neural network receiving the past values of the numeric data time flow input and the past values of the weighted concept vector as input, and supplying the predicted numeric data time flow values and the future values of the weighted concept vector as an output.

UNITED STATES PATENT AND TRADEMARK OFFICE
CERTIFICATE OF CORRECTION

PATENT NO.        : 7,299,214 B2
APPLICATION NO.   : 10/503744
DATED             : November 20, 2007
INVENTOR(S)       : Stephane Martin, Guillaume Allys and Luc De Bois It is certified that error appears in the above-identified patent and that said Letters Patent is hereby corrected as shown below:

Column 3, line 10, cancel the text beginning with "6. A system" to and ending "numeric data time flow." in column 3, line 20, and insert the following claim:

6.    A system for predictive analysis of numeric data time flows associated with text information, the system comprising:
    a numeric data time flow input;
    a text information input;
    a predictor for automatically predicting values of a numeric data time flow based on past values of the numeric data time flow input and a weighted concept vector; and
    an analyzer for analyzing text information to provide the predictor with a weighted concept vector in a multi-dimensional space of predefined concepts, the weighted concept vector being associated with the past values of the numeric data time flow,
    wherein the predictor receives as inputs the past values of the numeric data time flow input and the weighted concept vector, and outputs predicted numeric data time flow values based on the predictive analysis of numeric data time flow input and the weighted concept vector.

Column 3, line 21, cancel the text beginning with "7. A system" to and ending "weighted concept vector." in column 4, line 11, and insert the following claim:

7.    A system for predictive analysis of numeric data time flows associated with text information, the system comprising:
    a numeric data time flow input;
    a text information input;
    prediction means for automatically predicting values of a numeric data time flow based on past values of the numeric data time flow input and a weighted concept vector; and
    analyzing means for analyzing text information to provide the prediction means with a weighted concept vector in a multi-dimensional space of predefined concepts, the weighted concept vector being associated with the past values of the numeric data time flow,
    wherein the prediction means receives as inputs the past values of the numeric data time flow input and the weighted concept vector, and predicts future values of the weighted concept vector based on the numeric data time flow input and past values of the weighted concept vector,
    the system further comprising means for generating future text information based on the predictive analysis of numeric data time flows associated with text information.

UNITED STATES PATENT AND TRADEMARK OFFICE
CERTIFICATE OF CORRECTION

PATENT NO. : 7,299,214 B2
APPLICATION NO. : 10/503744
DATED : November 20, 2007
INVENTOR(S) : Stephane Martin, Guillaume Allys and Luc De Bois It is certified that error appears in the above-identified patent and that said Letters Patent is hereby corrected as shown below:

Column 4, line 13, cancel the text beginning with "9. A system" to and ending "weighted concept vector." in column 4, line 21, and insert the following claim:

9. A method for predictively analyzing numeric data time flows associated with text information, the method comprising:
inputting a numeric data time flow and text information;
analyzing text information to provide a weighted concept vector in a multi-dimensional space of predefined concepts, wherein the weighted concept vector is associated with past values of the numeric data time flow; and
automatically predicting future values of the numeric data time flow based on the predictive analysis of the numeric data time flow and the weighted concept vector.

Signed and Sealed this

Sixth Day of May, 2008

JON W. DUDAS
*Director of the United States Patent and Trademark Office*